Aug. 29, 1961  O. C. ROGERS, JR  2,998,212
CANOPY ACTUATOR
Filed Feb. 12, 1958  3 Sheets-Sheet 1
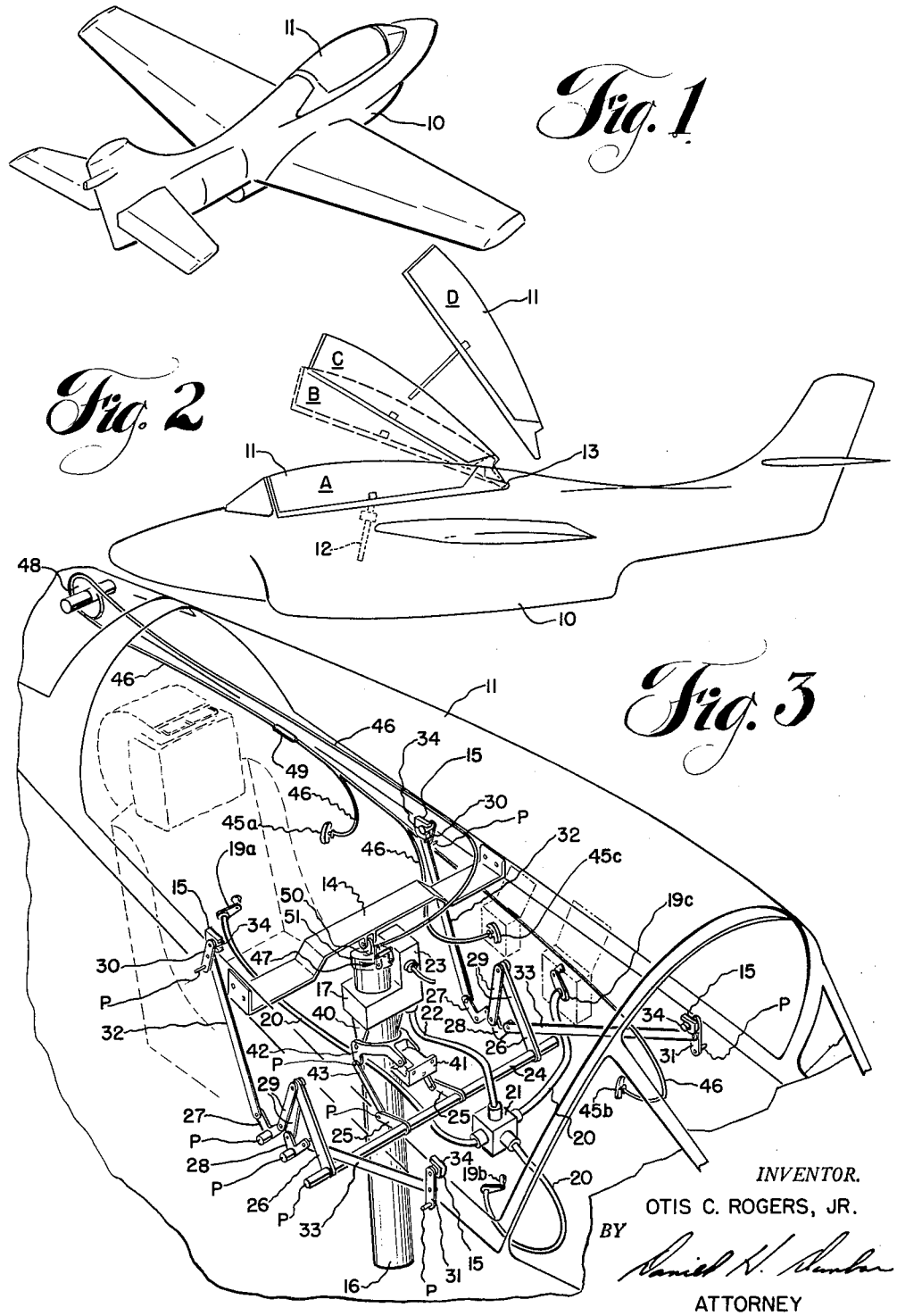
INVENTOR.
OTIS C. ROGERS, JR.
BY
ATTORNEY

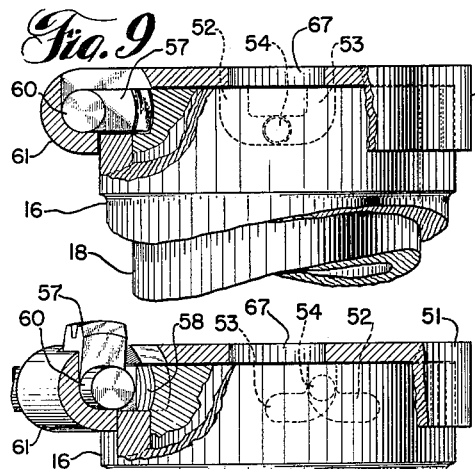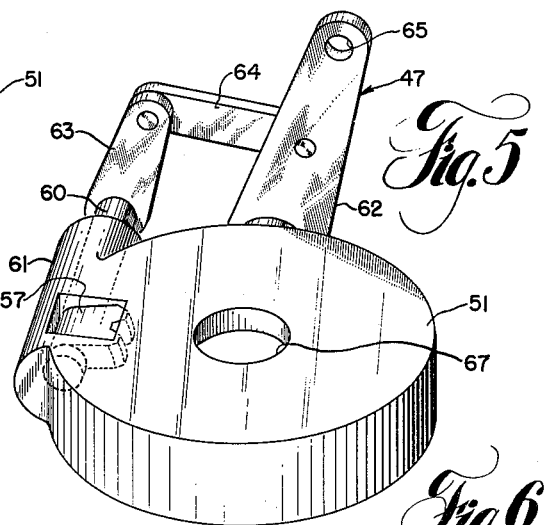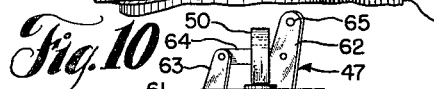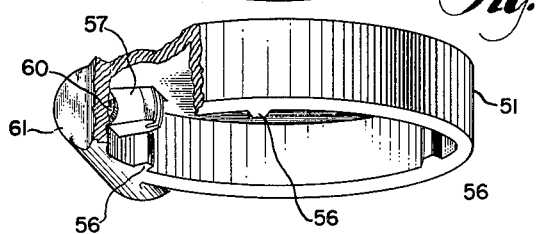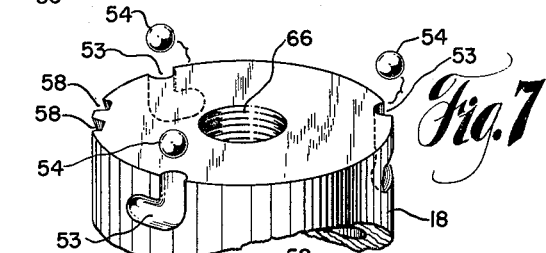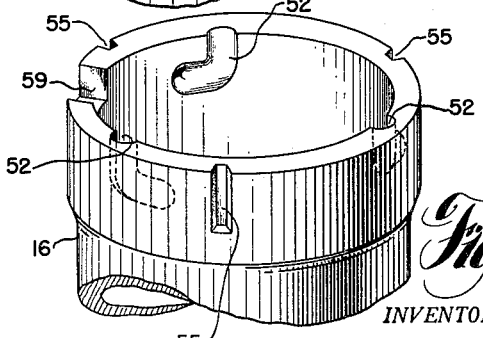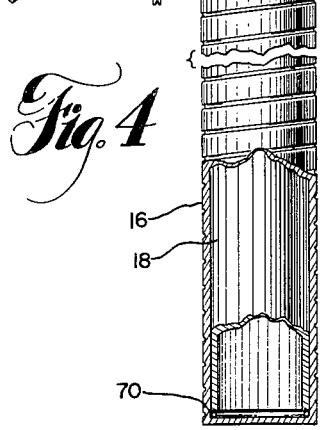

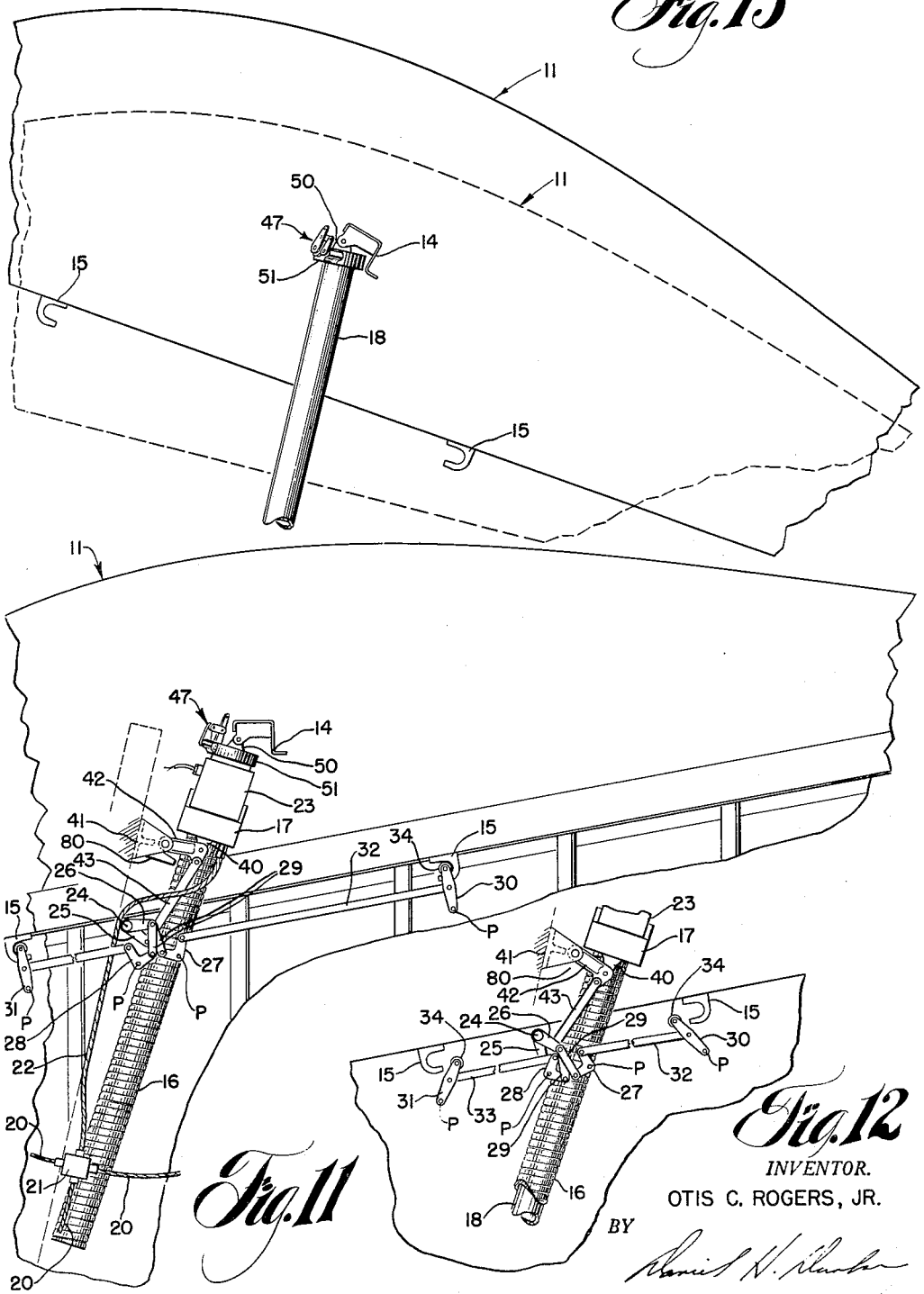

2,998,212
CANOPY ACTUATOR
Otis C. Rogers, Jr., Columbus, Ohio, assignor to North American Aviation, Inc.
Filed Feb. 12, 1958, Ser. No. 714,873
8 Claims. (Cl. 244—121)

This invention pertains generally to an actuator and relates more particularly to an improved actuator for use in aircraft canopy applications and the like.

Technical developments with respect to high-density, high-performance aircraft have dictated that provision be made within such aircraft for compact, efficient, and reliable actuator means which may be utilized to movably raise or lower an attached canopy component or the like in routine situations, and which may be further utilized to raise and/or jettison such attached component in an emergency situation.

Accordingly, it is an object of this invention to provide an actuator which may be utilized to open and close an airplane canopy member as for normal pilot-ingress and pilot-egress, and which may be utilized also to open and jettison such canopy member in emergency situations.

Another object of this invention is to provide an actuator which may be utilized to jettison an attached aircraft enclosure member, or the like, from either its normally closed or normally open position.

Another object of this invention is to provide an actuator, for aircraft and like applications, which may be actuated through the use of manual, electrical, and pneumatic power media.

Another object of this invention is to provide a canopy actuator which may be connected to a canopy unlocking mechanism, and which functions to actuate that mechanism.

Another object of this invention is to provide an actuator wherein relatively large powering forces are made continuously and immediately available for emergency use.

A still further object of this invention is to provide an aircraft actuator which has minimum installation space and weight requirements.

Another object of this invention is to provide an actuator which may be operated within pilot-occupied enclosures in a manner which does not produce interior conditions which are adverse to comfortable human occupancy.

Another object of this invention is to provide an actuator which requires a minimum of components, which is relatively simple to manufacture, which requires a minimum of maintenance effort, and which has an extremely high degree of operation reliability.

Other objects and advantages of this invention will become more apparent when consideration is given to the drawings and detailed description forming portions of this application.

In the drawings, wherein like numerals are employed to reference like components throughout the same:

FIG. 1 is a perspective view of an airplane;

FIG. 2 is an elevational view of the airplane of FIG. 1 showing its canopy component in various operative positions;

FIG. 3 is a schematic pictorial view of the actuator of this invention showing the manner in which it may be combined with the canopy component of FIG. 2;

FIG. 4 is an elevational view of the actuator shown in FIG. 3 with portions thereof removed to show details of construction;

FIGS. 5 through 8 illustrate details of an axial and rotational interlock arrangement for the piston and cylinder components of the actuator of my invention;

FIGS. 9 and 10 are partial elevational views illustrating the operative positions of certain of the interlock components illustrated in FIGS. 5 through 8; and FIGS. 11, 12, and 13 are elevational views showing components of the actuator of this invention in various operative positions.

A typical airplane 10 is illustrated perspectively in FIG. 1, and is shown as being provided with a canopy member 11. Member 11 typically serves as an enclosure member for the cockpit portion of aircraft 10, and it is supported by and may be secured to fuselage components of the ship. In FIG. 2 canopy member 11 is illustrated in various of its operative positions as it is movably powered by actuator 12, which is the actuator of this invention, about pivot point 13. In position A member 11 is closed, and preferably latched; in position B canopy 11 has been raised to its normal open position by actuator 12; in position C, which will occur generally only in an emergency situation, portions of actuator 12 have been separated and the canopy partially removed from airplane 10 for jettisoning purposes; and at position D, enclosure 11 has been completely separated from the airplane 10 as during an emergency situation.

A method of utilizing actuator 12 with airplane 10 and its canopy component 11, is detailed pictorially and schematically in FIG. 3. As noted therein, canopy 11 is provided with a cross-beam 14, and also with latch hooks 15 which are mounted to a canopy frame portion for use in securing canopy 11 to fuselage components of airplane 10 in a closed position. Actuator 12 is comprised essentially of cylinder portion 16, drive unit 17, and a piston component 18 which is contained generally within cylinder 16 (FIG. 4). Drive unit 17 may be powered by manual forces applied through handles 19a, 19b, and 19c, which are movably coupled thereto through flexible shafts 20, junction gear box 21, and drive cable 22, or by electrical forces applied through electric motor 23. Handles 19a and 19b may each be located in a separate interior cockpit portion of airplane 10, and the handle 19c may be located so as to be accessible to persons positioned on the outside of airplane 10. Drive unit 17 is generally provided with a proper gear train, a thrust nut and/or other features and mechanisms to be hereinafter described, which couple the forces applied through either handles 19 or motor 23 to cause relative movement between cylinder 16 and drive unit 17.

FIG. 3 also illustrates a typical unlatching linkage which may be utilized to secure canopy 11 to fuselage components of airplane 10 while in a closed position. This unlatching linkage is shown as including a cross-rod 24 which is pivotally supported by fuselage structural components, and which is provided with lever arms 25 that are powered by actuator 12. Also, lever arms 26 are rigidly secured to rod 24 and they in turn drive bellcranks 27 and 28 (which are pivotally attached to either side of the fuselage) through connecting links 29. Latch levers 30 and 31 are pivotally attached to structural members and are connected to bellcranks 27 and 28 through connecting rods 32 and 33. Latch pins 34 are provided on levers 30 and 31 and cooperate with notches contained in latch hooks 15. In general, the linkage is identical on each side of canopy 11; pivotal components are shown as pivoting about points P which are movably fixed relative to appropriate fuselage structural members.

Actuator 12 and its drive unit 17 are further illustrated in FIG. 3 as being supported by and attached to the fuselage of airplane 10 through components 40, 41, 42, and 43. Bracket 40 is rigidly attached to drive unit 17 and bracket 41 is preferably rigidly attached to a fuselage component of airplane 10. Yoke 42 mechanically couples bracket 40 to bracket 41 and is pivotally attached to brackets 40 and 41 as shown. A connecting link 43 is provided intermediate yoke 42 and each of levers 25; pivot connections are provided at each extreme of each connecting link 43.

Release means for initiating actuation of the actuator of this invention in an emergency situation is shown as being comprised essentially of handles 45a, 45b, and 45c, an attached cable 46, and a cooperating linkage designated generally as 47. Cable 46 passes over pulley 48 and preferably passes through the pivot axis 13 of canopy 11. A disconnect 49 is provided in cable 46 to facilitate separation of the canopy 11 from airplane 10 during an emergency situation. Emergency handles 45 may be located, relative to the fuselage of airplane 10, in the same manner as are drive handles 19. A detailed description of the function and operation of linkage 47 will be provided hereinafter.

A portion of cylinder 16 has been removed in FIG. 4 to show the positioning of piston 18 therein. A stud or tang 50 is preferably secured to an end of piston 18, projects through opening 67 of cap 51 when the actuator is completely assembled, and is utilized for non-rotatably attaching portions of composite actuator 12 to cross-beam 14 of canopy component 11. A pivot pin such as might be used to attach tang 50 to cross-beam 14 permits the actuator to pivot relative to canopy 11 during canopy opening and closing operations but prevents piston 18, and cylinder 16 through cooperation of the rotational interlock feature hereinafter detailed, from rotating about their longitudinal axis. FIG. 4 also illustrates (by use of dashed lines) the outline of a gear train and a cooperating thrust nut contained within the housing of drive unit 17. The thrust nut is preferably provided with an interior screw thread which cooperates with the screw thread illustrated as comprising an exterior surface of cylinder 16, and also is preferably rotationally supported within drive unit 17 on a suitable low-friction bearing member (not shown).

The gear train is provided to mechanically couple the thrust nut to drive cable 22 and to electric motor 23; rotation of cable 22 or the output shaft of motor 23 in a proper direction will cause the gear train to rotate the thrust nut relative to the housing component of drive unit 17. Because rotation of piston 18 and cylinder 16 about their longitudinal axes is prevented by the attachment of tang 50 to the canopy and by the rotational interlock to be hereinafter detailed, and because the housing, gear train, and other components of drive unit 17 are prevented from rotating about the cylinder 16-piston 18 combination, rotation of the thrust nut about its axis will cause axial movement of cylinder 16 and components secured thereto relative to drive unit 17 and the attaching bracketry. Control of upward or downward axial movement of cylinder 16 is effected through proper selection of the direction of rotation of cable 22 or the output shaft of motor 23.

A charge of highly pressurized gas is contained within cylinder 16 and the hollowed portion of piston 18, and is provided for utilization in an essentially emergency situation wherein it is desired to quickly open and/or remove canopy 11 as for jettisoning purposes. A seal means 70 is provided to prevent leakage of gas from between cylinder 16 and piston 18. A check-valve type inlet fitting (not shown) and a suitable pressure gage (not shown) may be made to cooperate with the interior of piston 18 either through the bottom of cylinder 16 or through cooperation with hollow core features which may be provided in tang 50. The quantity (pressure) of gas contained within the actuator must be sufficiently large to cause unlatching of canopy 11 and separation of that component from airplane 10 when the actuator is used in an emergency situation. Details of an emergency situation actuation will be set forth hereinafter.

It is preferred that suitable axial interlock features and rotational interlock features be provided as between cylinder 16 and piston 18. A satisfactory axial interlock arrangement is illustrated in the drawings as being comprised of: L-shaped grooves 52 provided on the interior surface of cylinder 16; reversely oriented L-shaped grooves 53 provided on an exterior portion of piston 18, and spherical members 54 which cooperate with grooves 52 and 53. The vertical portions of each groove 52 and 53 must be cooperatively aligned for assembly of the actuator, and the horizontal portions of each groove 52 and 53 are aligned when the unit is properly assembled. Grooves 52 and 53 are provided with a semi-circular cross-section to provide proper cooperation therebetween with spheres 54.

A suitable rotational interlock arrangement is illustrated in the drawings as being comprised of: cap 51, which is keyed to cylinder 16 through grooves 55 and cooperating lugs 56; locking lug 57 which is rotationally mounted on cap 51; and grooves 58 provided in piston 18 to cooperate with locking lug 57. Notch 59 is utilized on cylinder 16 to provide clearance between portions of cylinder 16 and locking lug 57 when the latter is being effectively utilized.

Locking lug 57 is movably attached to cable 46 (FIG. 3) through linkage 47. Linkage 47 is illustrated as being comprised of: shaft 60, which is rotationally coupled to locking lug 57 and which is carried within housing portion 61 of cap 51; lever arm 62, which is pivotally attached to cap 51, lever arm 63, which is fixedly attached to shaft 60; and link 64 which movably connects arm 62 to arm 63. A hole 65 is provided in arm 62 for attachment of cable 46.

A threaded opening 66 may be provided in the end of piston 18 to receive a cooperating thread (not shown) provided on the shank of tang 50. An opening 67 is preferably provided in cap 51 to permit the projection of tang 50 therethrough. Not shown are a tang shoulder, a tang circumferential groove, and a retaining ring arrangement for preventing axial movement of cap 51 relative to piston 18 and/or tang 50. This latter arrangement is deemed well-known to those skilled in the art, and hence it is not illustrated in detail.

To assemble the piston-cylinder portions of the actuator described herein, the following steps are suggested. Cylinder 16, piston 18, and seal means 70 are properly assembled with the vertical portions of grooves 52 and 53 in alignment (FIG. 10). Spheres 54 are then placed in each groove 52-groove 53 combination, and piston 18 is rotated relative to cylinder 16 to the position shown by FIG. 9. In this position, cylinder 16 and piston 18 cannot be moved axially relative to each other. Cap 51 is then placed on the piston-cylinder assembly with lugs 56 contained in grooves 55, and the retainer ring hereinbefore mentioned is engaged with tang 50 to axially lock cap 51 in position on piston 18.

Continuing the assembly, linkage 47 may be rotated an amount sufficient to engage the projections of locking lug 57 with grooves 58. Compressed gas (e.g., nitrogen, carbon dioxide, air, or the like) is then charged into the assembly to a pressure of 3000 p.s.i. to fill the hollow interior portion of piston 18 intermediate piston 18 and cylinder 16. Seal means 70 holds the internal pressure at the initially provided level.

Thus it will be noted that the highly compressed charge of gas tends to cause rapid separation of piston 18 and cylinder 16, but the axial interlock arrangement prevents such separation when the components thereof are positioned as shown in FIG. 9. Also, with respect to FIG. 9, engagement of lug 57 with grooves 58 prevents rotation of cylinder 16 relative to piston 18.

When it is desired to utilize the compressed gas to cause rapid piston-cylinder separation, as in an emergency situation, linkage 47 and cylinder 16 may be rotated to initiate such action. Initial movement of lever 62 moves lug 57 out of engagement with grooves 58 of piston 18; when lug 57 has reached its stop position, as in FIG. 10, continued forces applied to lever 62 cause cap 51 and cylinder 16 to rotate relative to piston 18. In connection therewith, it should be noted that arm 62 is located distant from the axis of rotation of cylinder 16, and piston 18 is rotationally restrained by its attachment to canopy cross-beam 14. When, through movement of cable 46 (FIG. 3), cylinder reaches the relative position shown in FIG. 10, the compressed gas will be permitted to expand because spheres 54 will have been moved into the vertical portion of each groove 52-groove 53 combination, and they no longer fulfill an axial interlock function.

Operation of the actuator of this invention, with respect to the canopy and canopy latching linkage components of FIG. 3 is shown more clearly in FIGS. 11 through 13.

In FIG. 11, actuator 12 and attached canopy 11 are illustrated as being in their typical relative positions when canopy 11 is latched to airplane 10 in a closed position. In a normal situation, opening forces applied through cable 22 or motor 23 in the correct direction will cause the thrust nut (FIG. 4) to rotate. Because drive unit 17 and the piston 18-cylinder 16 combination are not free to rotate about the axis of rotation of the thrust nut, relative axial motion therebetween is caused. Drive unit 17 moves axially downward with respect to cylinder 16 (FIG. 11) until bracket 42 is brought to bear against stop portion 80 of bracket 41. During this downward movement, drive unit 17, through its connection with bracket 40, bracket 42, links 43, lever arms 25, cross-rod 24, levers 26, connecting links 29, bellcranks 27 and 28, and connecting rods 32 and 33, causes each latch pin 34 contained on lever arms 30 and 31 to move out of engagement with its respective latch hook 15. The resultant unlatched condition is shown in FIG. 12. Continuation of the opening effort causes drive unit 17 to move cylinder 16 upward relative thereto, and pivots canopy 11 about its pivot point 13 (FIG. 2) to raise it to an open position. Closing and latching of the canopy is effected in a reverse manner.

In an emergency situation, and regardless of whether the canopy 11 is in a latched, unlatched, partially open, or completely open position, the canopy can be jettisoned merely by applying sufficient force to cable 46 as through any of handles 45. The manually applied force will first disengage lug 57 from grooves 58 and then rotate cylinder 16 relative to piston 18 to place the hereinbefore described axial interlock arrangement in an inoperative condition. The pressurized gas will first expand to cause cylinder 16 and drive unit 17 to move downward relative to piston 18 to thus unlatch canopy 11 from latch hooks 15. Continued expansion of the gas causes piston 18 (and unlatched canopy 11) to move upwardly with respect to cylinder 16 and the support bracket 41 which is attached to a structural component of airplane 10. When canopy 11 reaches the position C of FIG. 2, as further shown in FIG. 13, piston 18 is completely separated from cylinder 16 and the energy imparted to canopy 11 and piston 18 by the gas charge, together with air resistance forces in the case of a moving airplane, causes canopy 11 to be jettisoned from airplane 10. The canopy jettisoning sequence may be utilized as a preparatory step to ejection of the pilot from within airplane 10 by means of ballistically powered or rocket powered ejection seat.

While I have illustrated a preferred arrangement of the actuator of my invention, other arrangements are recognized. For example, the axial interlock arrangement may be provided at the lower extreme of the actuator cylinder-piston arrangement, and other forms of an axial or rotational interlock and release means might be utilized.

From the foregoing description and from the drawings it will be observed that the actuator of my invention provides a means whereby a single compact unit may be utilized for normal and emergency situations and whereby large driving forces are made continuously and immediately available for use in emergency situations. Also, the actuator of this invention may be utilized to power an unlatching linkage and may be installed in a minimum space with minimum weight requirements.

It is to be understood that the forms of the invention herewith shown and described are to be taken as preferred embodiments of the same, but that various changes in the shape, size, and arrangement of parts may be resorted to without departing from the spirit of the invention or the scope of the subjoined claims.

I claim:
1. An actuator for aircraft applications and the like, comprising: an actuator cylinder component, powered drive means positioned in surrounding and contacting relation to said actuator cylinder component, an actuator piston component in said cylinder component, a compressed gas supply completely contained within said cylinder and piston components and continuously urging said components apart, rigid interlock means projected into each of said actuator components, and relatively movable release means operationally coupled to said interlock means, said piston component being restrained by said interlock means against movement relative to said cylinder component when said cylinder component is driven relative to supporting structure by said drive means, and said actuator components being moved axially together when powered by said drive means.

2. An actuator for combination with a movable aircraft load, a movable latch means restricting movement of said load, and a relatively fixed support, comprising: an actuator cylinder member, an actuator piston member projected within said cylinder member, pressurized gas contained by said actuator members to continuously urge said actuator members apart, rigid interlock means projected into said actuator members to prevent relative movement therebetween, and movable release means for placing said interlock means in an inoperative condition, one of said actuator members being connected to said movable load, and the other of said actuator members being coupled to said movable latch means and to said support whereby said latch means is first moved relative to said aircraft load when said release means is moved to inactivate said interlock means.

3. The combination defined in claim 2, wherein there is provided a powered drive element, said drive element being mounted in surrounding and contacting relation to said cylinder member whereby said drive element and said latch means are initially moved when said release means is moved to activate said interlock means.

4. An actuator for aircraft applications and the like comprising: a cylinder portion having a longitudinal axis, a piston portion positioned at least partially within said cylinder portion, pressurized gas contained by said cylinder and piston portions and continuously urging said cylinder and piston portions apart, rigid axial interlock means projected into said cylinder portion and into said piston portion, separate rigid rotational interlock means having a rotational axis and being projected into said cylinder portion and into said piston portion, and force-transmitting release means, said release means being connected to said rotational interlock means in off-center relation to said rotational interlock means rotational axis and being connected to said actuator cylinder portion in off-center relation to said cylinder portion longitudinal axis whereby said rotational interlock means is inactivated and said actuator cylinder portion is rotated to inactivate said axial interlock means when a release force is transmitted to said actuator through said release means.

5. The actuator defined in claim 4, wherein there is provided a powered drive means, said drive means being positioned in surrounding and contacting relation to said actuator cylinder portion and moving said cylinder portion, said piston portion, and said rotational interlock means axially together when powered.

6. In combination with airplane structure which supports a jettisonable canopy member, an actuator comprising: a cylinder portion, a piston portion contained partially within said cylinder portion and attached to said canopy member, compressed gas contained within said cylinder and piston portions and continuously urging said portions apart, interlock means projected into said cylinder and piston portions to rotationally and axially couple said portions as a unit, release means operationally connected to said interlock means, and a powered drive means connected to said cylinder portion in surrounding relation, said drive means being supported by said airplane structure to thereby move said cylinder and piston portions, said compressed gas, and said canopy member together with respect to said airplane structure when said drive means are powered.

7. The combination defined in claim 6, wherein there is included a movable latch means connected to said structure and engaged with said canopy member, said drive means being additionally connected to said latch means whereby said compressed gas moves said cylinder portion, said drive means, and said latch means simultaneously when said release means is moved to inactivate said interlock means.

8. The combination defined in claim 6, wherein said interlock means includes an axial interlock portion and a separate rotational interlock portion, said rotational interlock portion being connected to said release means whereby movement of said release means first inactivates said rotational interlock portion and then rotates said cylinder and piston portions relative to each other to inactivate said axial interlock portion.

References Cited in the file of this patent

UNITED STATES PATENTS

| | | |
|---|---|---|
| 2,283,223 | Nallinger | May 19, 1942 |
| 2,459,948 | Lobelle | Jan. 25, 1949 |
| 2,479,713 | Beach | Aug. 23, 1949 |
| 2,736,308 | Ferrando et al. | Feb. 28, 1956 |
| 2,755,042 | Paddon | July 17, 1956 |

FOREIGN PATENTS

| | | |
|---|---|---|
| 585,274 | Great Britain | Feb. 4, 1947 |